(12) United States Patent
Zhan

(10) Patent No.: US 11,496,206 B2
(45) Date of Patent: *Nov. 8, 2022

(54) RADIO FREQUENCY SIGNAL BOOSTERS

(71) Applicant: Cellphone-Mate, Inc., Fremont, CA (US)

(72) Inventor: Hongtao Zhan, Fremont, CA (US)

(73) Assignee: Cellphone-Mate, Inc., Fremont, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/247,895

(22) Filed: Dec. 29, 2020

(65) Prior Publication Data

US 2021/0336690 A1 Oct. 28, 2021

Related U.S. Application Data

(63) Continuation of application No. 16/100,512, filed on Aug. 10, 2018, now Pat. No. 10,911,130.

(60) Provisional application No. 62/561,873, filed on Sep. 22, 2017, provisional application No. 62/544,207, filed on Aug. 11, 2017.

(51) Int. Cl.
*H04B 7/155* (2006.01)
*H04B 3/54* (2006.01)
*H04Q 1/08* (2006.01)
*H04Q 1/02* (2006.01)
*H04W 84/12* (2009.01)

(52) U.S. Cl.
CPC ......... *H04B 7/15507* (2013.01); *H04B 3/548* (2013.01); *H04B 7/15535* (2013.01); *H04Q 1/02* (2013.01); *H04Q 1/08* (2013.01); *H04W 84/12* (2013.01)

(58) Field of Classification Search
None
See application file for complete search history.

(56) References Cited

U.S. PATENT DOCUMENTS

| 7,783,270 | B1 | 8/2010 | Haab et al. |
| 10,911,130 | B2 | 2/2021 | Zhan |
| 2002/0039885 | A1 | 4/2002 | Weissman et al. |
| 2010/0019849 | A1 | 1/2010 | Knickerbocker et al. |
| 2010/0225272 | A1 | 9/2010 | Kirby et al. |
| 2015/0110153 | A1 | 4/2015 | Hoblit et al. |

(Continued)

FOREIGN PATENT DOCUMENTS

| KR | 10-2015-0051807 A | 5/2015 |
| WO | WO 2005/094154 A2 | 10/2005 |

OTHER PUBLICATIONS

International Search Report and Written Opinion of the International Searching Authority for International Application No. PCT/US2018/046240 dated Feb. 7, 2019, in 18 pages.

*Primary Examiner* — Walter J Divito
(74) *Attorney, Agent, or Firm* — Knobbe, Martens, Olson & Bear, LLP

(57) ABSTRACT

Radio frequency signal boosters are provided herein. In certain embodiments, a signal booster system includes a signal booster that is proximately located to an outdoor base station antenna. Implementing the signal booster system in this manner can provide a number of advantages relative to a configuration in which the signal booster is far from a base station antenna. For example, a long cable connected from an indoor signal booster to an outdoor base station antenna can be several meters long, resulting in significant cable loss that degrades transmit power and/or receiver sensitivity.

20 Claims, 11 Drawing Sheets

(56) References Cited

U.S. PATENT DOCUMENTS

2015/0215011 A1 7/2015 Hartenstein
2016/0198347 A1 7/2016 Zhan
2017/0094408 A1 3/2017 Napoli et al.

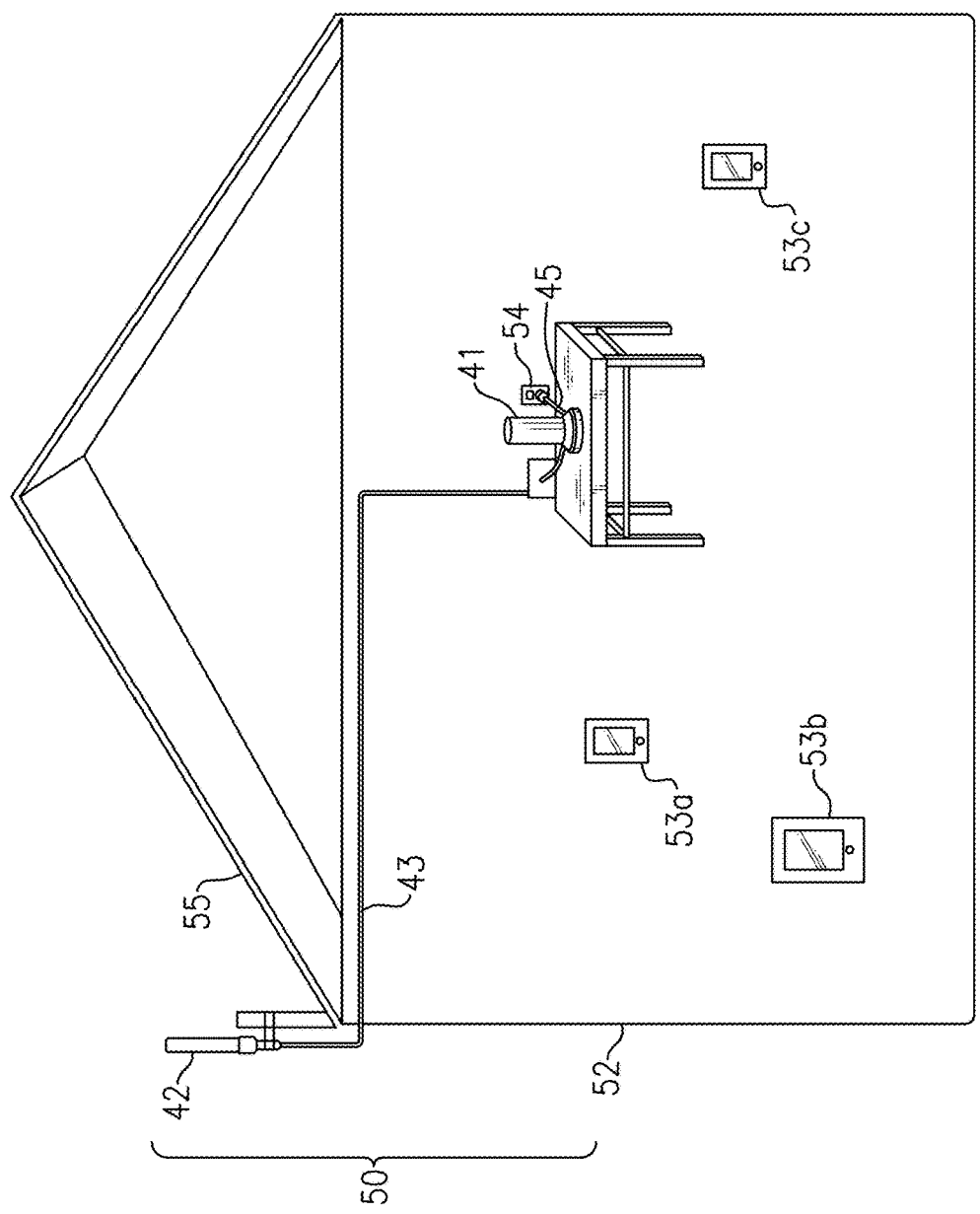
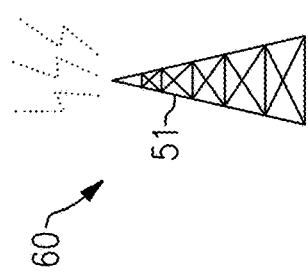
FIG.2

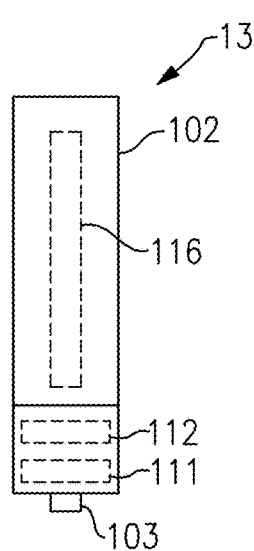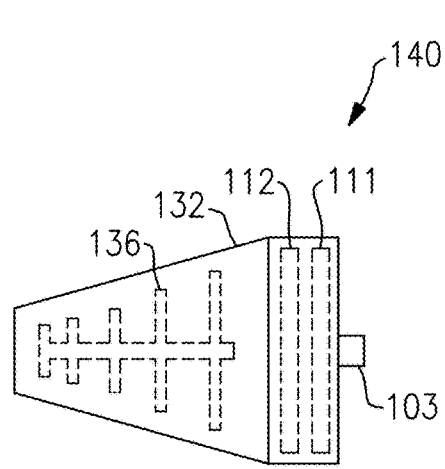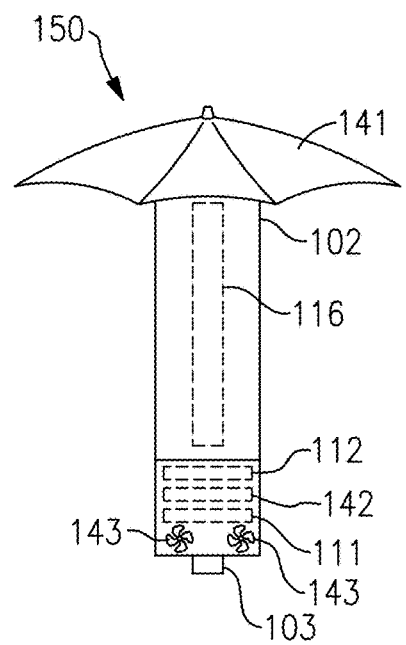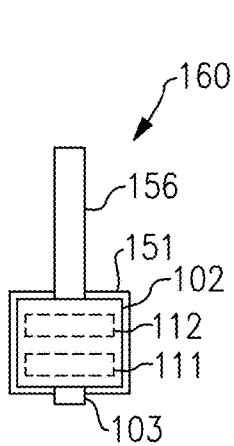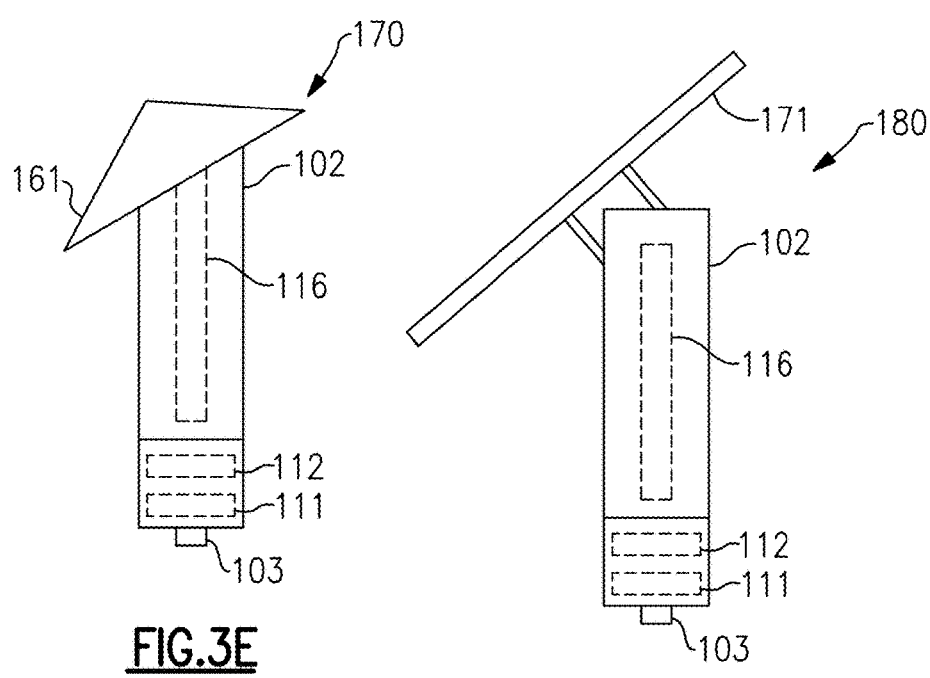

RADIO FREQUENCY SIGNAL BOOSTERS

REFERENCE TO RELATED CASES

This application is a continuation of U.S. application Ser. No. 16/100,512, filed Aug. 10, 2018 and titled "RADIO FREQUENCY SIGNAL BOOSTERS," which claims the benefit of priority under 35 U.S.C. § 119 of U.S. Provisional Patent Application No. 62/561,873, filed Sep. 22, 2017 and titled "RADIO FREQUENCY SIGNAL BOOSTERS," and of U.S. Provisional Patent Application No. 62/544,207, filed Aug. 11, 2017 and titled "RADIO FREQUENCY SIGNAL BOOSTERS," each of which is herein incorporated by reference in its entirety.

FIELD

Embodiments of the invention relate to electronic systems and, in particular, to radio frequency (RF) signal boosters.

BACKGROUND

A cellular or mobile network can include base stations for communicating with wireless devices located within the network's cells. For example, base stations can transmit signals to wireless devices via a downlink (DL) channel and can receive signals from the wireless devices via an uplink (UL) channel. In the case of a network operating using frequency division duplexing (FDD), the downlink and uplink channels are separated in the frequency domain such that the frequency band operates using a pair of frequency channels.

A wireless device may be unable to communicate with any base stations when located in a portion of the mobile network having poor or weak signal strength. To improve a network's signal strength and/or coverage, a radio frequency (RF) signal booster can be used to amplify signals in the network. For example, the signal booster can be used to amplify or boost signals having frequencies associated with the frequency ranges of the network's uplink and downlink channels.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description of Embodiments" one will understand how the features of this invention provide advantages that include improved communications between base stations and mobile devices in a wireless network.

In one aspect, a signal booster system includes an indoor antenna unit including a mobile station antenna configured to receive a radio frequency (RF) uplink signal and to transmit a boosted RF downlink signal, and an outdoor signal booster. The outdoor signal booster includes a base station antenna integrated with the outdoor signal booster and configured to receive an RF downlink signal and to transmit a boosted RF uplink signal, and booster circuitry configured to generate the boosted RF downlink signal based on amplifying one or more downlink channels of the RF downlink signal, and to generate the boosted RF uplink signal based on amplifying one or more uplink channels of the RF uplink signal.

In another aspect, a method of signal boosting is provided. The method includes receiving an RF uplink signal using an indoor mobile station antenna, sending the RF uplink signal to an outdoor signal booster over a cable, amplifying the RF uplink signal to generate a boosted RF uplink signal using the outdoor signal booster, transmitting the boosted RF uplink signal using an outdoor base station antenna, receiving an RF downlink signal using the outdoor base station antenna, amplifying the RF downlink signal to generate a boosted RF downlink signal using the outdoor signal booster, sending the boosted RF downlink signal to the indoor mobile station antenna using the cable, and transmitting the boosted RF downlink signal using the indoor mobile station antenna.

In another aspect, a signal booster system installed in a building is provided. The signal booster system includes an indoor antenna unit inside of the building and including a mobile station antenna configured to receive an RF uplink signal and to transmit a boosted RF downlink signal, and an outdoor signal booster outside of the building. The outdoor signal booster includes a base station antenna integrated with the outdoor signal booster and configured to receive an RF downlink signal and to transmit a boosted RF uplink signal, and booster circuitry configured to generate the boosted RF downlink signal based on amplifying one or more downlink channels of the RF downlink signal, and to generate the boosted RF uplink signal based on amplifying one or more uplink channels of the RF uplink signal.

In another aspect, a signal booster system is provided. The signal booster system includes an indoor mobile station antenna configured to receive an RF uplink signal and to transmit a boosted RF downlink signal, an outdoor base station antenna configured to receive an RF downlink signal and to transmit a boosted RF uplink signal, a signal booster located within about 5 feet of the outdoor base station antenna, and a cable connecting the signal booster and the indoor mobile station antenna. The signal booster includes booster circuitry configured to generate the boosted RF downlink signal based on amplifying one or more downlink channels of the RF downlink signal, and to generate the boosted RF uplink signal based on amplifying one or more uplink channels of the RF uplink signal.

In another aspect, a method of signal boosting is provided. The method includes receiving an RF uplink signal using an indoor mobile station antenna, sending the RF uplink signal to a signal booster over a cable, amplifying the RF uplink signal to generate a boosted RF uplink signal using the signal booster, transmitting the boosted RF uplink signal using an outdoor base station antenna that is located within about 5 feet of the signal booster, receiving an RF downlink signal using the outdoor base station antenna, amplifying the RF downlink signal to generate a boosted RF downlink signal using the signal booster, sending the boosted RF downlink signal to the indoor mobile station antenna using the cable, and transmitting the boosted RF downlink signal using the indoor mobile station antenna.

In another aspect, a signal booster system installed in a building is provided. The signal booster system includes an indoor mobile station antenna inside the building and configured to receive an RF uplink signal and to transmit a boosted RF downlink signal, an outdoor base station antenna outside the building and configured to receive an RF downlink signal and to transmit a boosted RF uplink signal, a signal booster located within about 5 feet of the outdoor base station antenna, and a cable connecting the signal booster and the indoor mobile station antenna. The signal booster includes booster circuitry configured to generate the boosted RF downlink signal based on amplifying one or more downlink channels of the RF downlink signal, and to generate the boosted RF uplink signal based on amplifying one or more uplink channels of the RF uplink signal.

In another aspect, a signal booster system includes a plurality of antennas including an indoor mobile station antenna operable to wirelessly communicate with one or more mobile devices and an outdoor base station antenna operable to wirelessly communicate with one or more base stations, an indoor antenna unit coupled to the indoor mobile station antenna, a signal booster coupled to the outdoor base station antenna and comprising booster circuitry configured to provide amplification to an RF uplink signal and to an RF downlink signal, and an isolator/combiner circuit separated from the indoor antenna unit and the signal booster, wherein the isolator/combiner circuit is configured to provide power to the indoor antenna unit and the signal booster.

In another aspect, a method of signal boosting is provided. The method includes receiving an RF uplink signal using an indoor mobile station antenna, sending the RF uplink signal to a signal booster over a cable, amplifying the RF uplink signal to generate a boosted RF uplink signal using the signal booster, transmitting the boosted RF uplink signal using an outdoor base station antenna, receiving an RF downlink signal using the outdoor base station antenna, amplifying the RF downlink signal to generate a boosted RF downlink signal using the signal booster, sending the boosted RF downlink signal to the indoor mobile station antenna using the cable, transmitting the boosted RF downlink signal using the indoor mobile station antenna, and providing power to the indoor antenna unit and the signal booster over the cable using an isolator/combiner circuit separated from the indoor antenna unit and the signal booster.

In another aspect, a signal booster system installed in a building is provided. The signal booster system includes a plurality of antennas including an indoor mobile station antenna inside the building and operable to wirelessly communicate with one or more mobile devices and an outdoor base station antenna outside of the building and operable to wirelessly communicate with one or more base stations, an indoor antenna unit inside of the building and coupled to the indoor mobile station antenna, a signal booster coupled to the outdoor base station antenna and comprising booster circuitry configured to provide amplification to an RF uplink signal and to an RF downlink signal, and an isolator/combiner circuit separated from the indoor antenna unit and the signal booster, wherein the isolator/combiner circuit is configured to provide power to the indoor antenna unit and the signal booster.

BRIEF DESCRIPTION OF THE DRAWINGS

FIG. 2 is a schematic diagram of a mobile network according to one embodiment.

FIG. 3A is a side view of one embodiment of an outdoor signal booster.

FIG. 3B is a side view of another embodiment of an outdoor signal booster.

FIG. 3C is a side view of another embodiment of an outdoor signal booster.

FIG. 3D is a side view of another embodiment of an outdoor signal booster.

FIG. 3E is a side view of another embodiment of an outdoor signal booster.

FIG. 3F is a side view of another embodiment of an outdoor signal booster.

DETAILED DESCRIPTION OF EMBODIMENTS

Figure 1A:
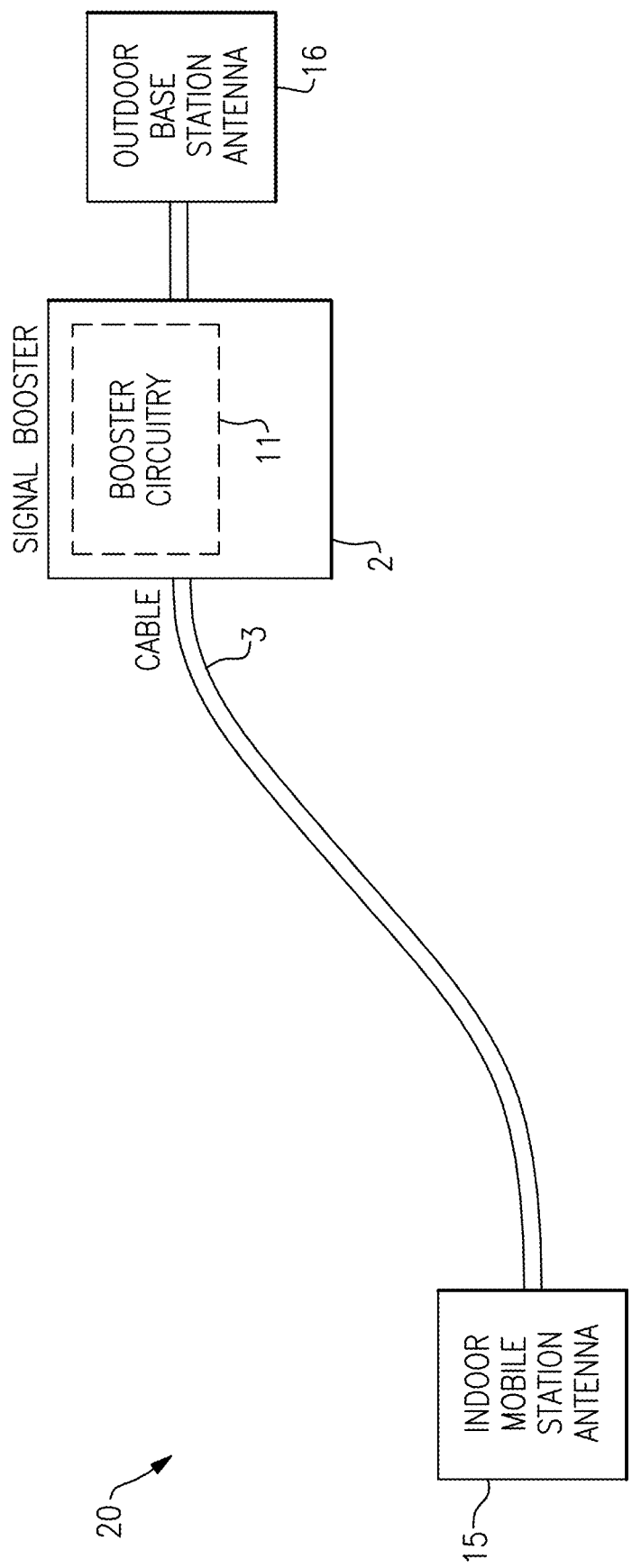
FIG. 1A is a schematic diagram of a signal booster system according to one embodiment.

Various aspects of the novel systems, apparatus, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatus, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Installing a signal booster system in a building can advantageously improve both downlink signal strength and uplink signal strength of mobile devices within the building.

For example, walls of buildings can have a shielding effect on signals transmitted and received by mobile devices within the building. Furthermore, buildings can include metal, such as beams, pipes, brackets, nails, and screws that operate as a Faraday cage that inhibits propagation of radio waves.

The shielding effect of buildings can attenuate downlink signals from the base station within the buildings and/or attenuate uplink signals transmitted from within the buildings. Under most conditions, the shielding effect can cause signal strength to drop. In one example, the shielding effect reduces signal strength below a threshold for cellular communication, thereby preventing successful voice and/or data communication. In another example, mobile devices operate with higher transmit power to compensate for a loss in signal strength from shielding, and thus operate with greater power consumption and reduced battery life. In yet another example, the mobile device operates with lower signal quality, and thus lower data rate and/or lower voice quality.

Accordingly, including a signal booster system in a building improves signal strength of mobile devices within the building. Furthermore, such a signal booster system also improves signal-to-noise ratio (SNR) of the mobile devices, thereby permitting mobile devices to transmit at a lower power level to extend battery life. For example, higher SNR can be realized by using superior antennas relative to those used in typical mobile phones, for instance, due to relaxed size and/or power constraints. Moreover, signal boosters can operate with better receivers and/or transmitters relative to mobile devices.

Various embodiments of signal boosters are provided herein.

FIG. 1A is a schematic diagram of a signal booster system 20 according to one embodiment. The signal booster system 20 includes a signal booster 2, a cable 3, an indoor mobile station antenna 15, and an outdoor base station antenna 16. As shown in FIG. 1A, the signal booster 2 includes booster circuitry 11.

In the illustrated embodiment, the outdoor base station antenna 16 is separate from the signal booster 2 and connected via a short cable. In certain implementations, the cable between the outdoor base station antenna 16 and the signal booster 2 is less than about 5 feet and/or provides less than 1 dB of loss at the highest signal frequency of interest.

Although the signal booster system 20 includes a separate base station antenna and signal booster, the teachings herein are also applicable to configurations in which the base station antenna 16 is integrated with the signal booster 2. In one example, the base station antenna 16 can be integrated inside of a housing of the signal booster 2 and/or extend therefrom. In another example, both an integrated base station antenna and external base station antenna are included. In such an implementation, multiple base station antennas can be used for communications or a particular base station antenna can be selected for communications at a given time.

The indoor mobile station antenna 15 is positioned within a building (for instance, a home), and the outdoor base station antenna 16 is positioned outside of the building. In certain implementations, the signal booster 2 is also positioned outside of the building with the outdoor base station antenna 16. In other implementations, the signal booster 2 is positioned indoors but in relatively close proximity to the outdoor base station antenna 16.

Proximately locating the signal booster 2 to the outdoor base station antenna 16 can provide a number of advantages relative to a configuration in which the signal booster 2 is far from a base station antenna. For example, a long cable connected from an indoor signal booster to an outdoor base station antenna can be several meters long, resulting in significant cable loss that degrades transmit power and/or receiver sensitivity. For instance, on the transmit side the cable loss can be present between an output of a power amplifier (PA) of the signal booster and the base station antenna, and thus can reduce the strength of transmitted signals and correspondingly degrade the range of communication of the signal booster system. Furthermore, on the receive side the cable loss can be present between the base station antenna and an input of a low noise amplifier (LNA) of the signal booster, and thus can reduce the strength of received signals and correspondingly degrade signal-to-noise ratio (SNR) and receiver sensitivity.

In contrast, the illustrated embodiment includes the signal booster 2 and outdoor base station antenna 16 in relatively close proximity and thus connected with low loss.

The booster circuitry 11 provides amplification to RF signals associated with one or more uplink and downlink channels. The booster circuitry 11 can include a wide variety of circuitry and/or components. Examples of circuitry and components of the booster circuitry 11 include, but are not limited to, amplifiers (for instance, LNAs, power amplifiers (PAs), variable gain amplifiers (VGAs), programmable gain amplifiers (PGAs), and/or other amplification circuits), filters (for instance, surface acoustic wave (SAW) filters, bulk acoustic wave (BAW) filters, film bulk acoustic resonator (FBAR) filters, active circuit filters, passive circuit filters, and/or other filtering structures), duplexers, circulators, frequency multiplexers (for instance, diplexers, triplexers, or other multiplexing structures), switches, impedance matching circuitry, attenuators (for instance, digital-controlled attenuators such as digital step attenuators (DSAs) and/or analog-controlled attenuators such as voltage variable attenuators (VVAs)), detectors, monitors, couplers, and/or control circuitry.

Figure 1B:
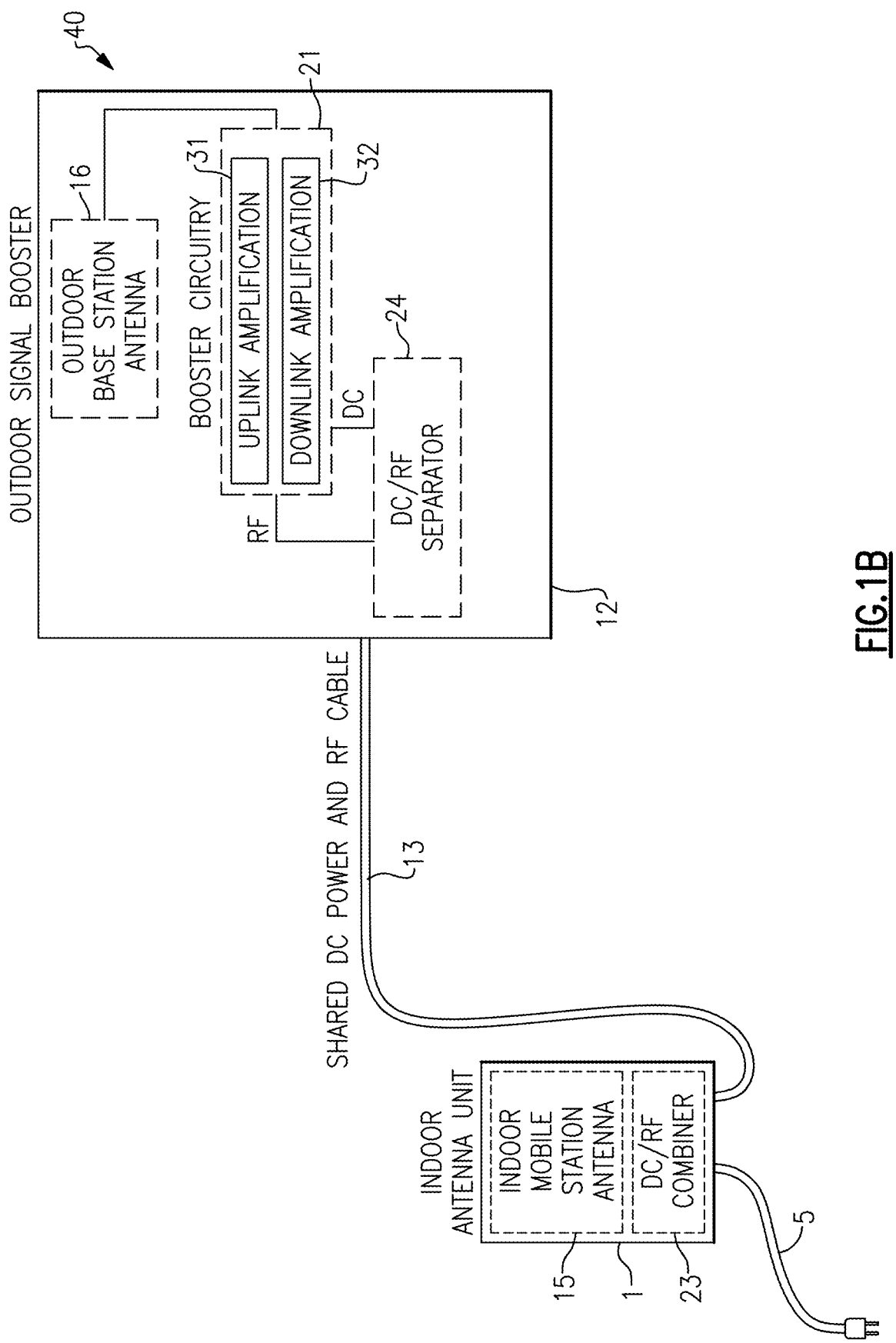
FIG. 1B is a schematic diagram of a signal booster system according to another embodiment.

FIG. 1B is a schematic diagram of a signal booster system 40 according to another embodiment. The signal booster system 40 includes an indoor antenna unit 1, an outdoor signal booster 12, a shared DC power and RF cable 13, and a power cable 5. As shown in FIG. 1B, the indoor antenna unit 1 includes an indoor mobile station antenna 15 and a DC/RF combiner 23. Additionally, the outdoor signal booster 12 includes a base station antenna 16, booster circuitry 21, and a DC/RF separator 24.

The signal booster system 40 advantageously includes the outdoor base station antenna 16 integrated with the outdoor signal booster 12. Integrating a base station antenna with an outdoor signal booster can improve transmit power and/or enhance receiver sensitivity relative to an implementation in which an external cable is used to connect a signal booster to a base station antenna.

For example, a signal booster can be placed inside a building, and a base station antenna can be placed on a roof of the building. However, in such an implementation, a length of a base station antenna cable can be several meters long, resulting in significant cable loss (for example, 7-8 dB or more).

Such cable loss can reduce transmit power and degrade receiver sensitivity. For example, on the transmit side the cable loss can be present between an output of a power amplifier (PA) of the signal booster and the base station antenna, and thus can reduce the strength of transmitted signals and correspondingly degrade the range of communication of the signal booster system. Furthermore, on the receive side the cable loss can be present between the base station antenna and an input of a low noise amplifier (LNA) of the signal booster, and thus can reduce the strength of received signals and correspondingly degrade signal-to-noise ratio (SNR) and receiver sensitivity. Moreover, cable loss is frequency dependent, and thus can become very significant as cellular communication frequencies increase, for instance, in 5G technologies associated with frequencies in the 6 GHz to 100 GHz range.

In contrast, the illustrated embodiment advantageously integrates the outdoor base station antenna 16 with the outdoor signal booster 12. Thus, the signal booster system 40 operates with enhanced transmit power and receiver sensitivity. Accordingly, the signal booster system 40 can communicate with base stations at further distances and/or in harsher radio environments. Furthermore, enhanced transmit power and receiver sensitivity also leads to higher SNR and a corresponding improvement in the quality, speed, and/or reliability of communications.

In certain configurations, the outdoor base station antenna 16 extends from a housing of the outdoor signal booster 12 and/or is integrated inside of the booster's housing. Although a single outdoor base station antenna 16 is illustrated, the teachings herein are applicable to configurations using multiple base station antennas.

With continuing reference to FIG. 1B, the indoor mobile station antenna 15 is integrated with the indoor antenna unit 1, in this embodiment. In certain configurations, the indoor mobile station antenna 15 is inside a housing of the indoor antenna unit 1. However, other implementations are possible, such as configurations in which the outdoor base station antenna 16 extends from the housing of the indoor antenna unit 1 or configurations in which the indoor antenna unit is omitted in favor of a standalone mobile station antenna. Although a single indoor mobile station antenna 15 is illustrated, the teachings herein are applicable to configurations using multiple mobile station antennas.

The indoor antenna unit 1 can be placed in any suitable location in an interior of the building. In one example, the indoor antenna unit 1 can be set on a table top, windowsill, floor, or other suitable location. In another example, the indoor antenna unit 1 is mountable or otherwise attachable to a wall, ceiling, or other suitable location.

Accordingly, the outdoor signal booster 12 with outdoor base station antenna 16 can be placed outdoors and isolated from the indoor mobile station antenna 15 within the building. The isolation can be provided at least in part by the building. Furthermore, in certain implementations explicit isolation structures can be included in the outdoor signal booster 12 and/or indoor antenna unit 1 to further enhance antenna-to-antenna isolation and inhibit unintended oscillation of the signal booster system 40.

In the illustrated embodiment, the indoor antenna unit 1 receives power from a building power source (for instance, an electrical outlet) via a power cable 5. In one example, a power adapter of the power cable 5 provides AC to DC conversion to provide the indoor antenna unit 1 with DC power. In another example, AC to DC conversion is provided by circuitry in the indoor antenna unit 1.

The indoor antenna unit 1 provides a DC supply voltage to the outdoor signal booster 12 via the shared DC power and RF cable 13, in this embodiment. In certain implementations, the indoor antenna unit 1 includes circuitry for combining a DC power supply and an RF signal, while providing isolation. For example, the indoor antenna unit 1 can combine a DC supply voltage generated from a building power source with RF signals associated with communications of the indoor mobile station antenna 15. The RF signals include RF signals transmitted by the indoor mobile station antenna 15 and RF signals received by the indoor mobile station antenna 15. Accordingly, the shared DC power and RF cable 13 can operate bi-directionally with respect to RF signaling.

In certain implementations, the shared DC power and RF cable 13 includes a conductor that carries an RF voltage that is superimposed on a DC supply voltage. Implementing a signal booster system with a shared DC power and RF cable can provide a number of advantages, such as reduced cabling cost, reduced connectors/connections, improved reliability, and/or enhanced integration. However, other implementations are possible. For example, in another embodiment, a separate power cable (DC and/or AC) is provided directly to the outdoor signal booster 12. In yet another embodiment, separate power and RF cables are bundled as a complex cable.

The outdoor signal booster 12 of FIG. 1B includes the DC/RF separator 24, which provides separation to extract a DC supply voltage from the shared DC power and RF cable 13 to thereby power the booster circuitry 21. Additionally, the DC/RF separator 24 also facilitates transmission and reception of RF signals by the outdoor signal booster 12 over the cable 13.

In certain implementations, the DC/RF separator 24 includes isolation circuitry (for instance, filters and/or other isolators) for isolating RF circuitry used for signal boosting from DC supply noise and separation circuitry for separating RF and DC.

Although the outdoor signal booster 12 is illustrated as including the DC/RF separator 24, in certain embodiments the DC/RF separator 24 is omitted. For example, the DC/RF separator 24 can be omitted in implementations in which DC and/or AC power is provided to the outdoor signal booster 12 separately from RF signals.

In the illustrated embodiment, the booster circuitry 21 receives RF uplink signals received from the indoor mobile station antenna 15 via the shared DC power and RF cable 13. The RF uplink signals are amplified by an uplink amplification circuit 31 of the booster circuitry 21, and subsequently transmitted on the outdoor base station antenna 16. The outdoor base station antenna 16 also receives RF downlink signals, which are amplified by a downlink amplification circuit 32 of the booster circuitry 21, and subsequently transmitted to the indoor mobile station antenna 15 via the shared DC power and RF cable 13.

The booster circuitry 21 can include a wide variety of circuitry and/or components. Examples of circuitry and components of the booster circuitry 21 can be as described earlier with respect to the booster circuitry 11 of FIG. 1A.

In certain implementations, the booster circuitry 21 and/or the DC/RF separator 24 are included on one or more circuit boards enclosed within the housing of the outdoor signal booster 12.

In certain configurations, the signal booster system 40 is operable to charge a battery of a user's mobile device. In one example, a charging cable is provided from the indoor antenna unit 1 for charging mobile devices. In another example, a mobile device can be coupled to the indoor antenna unit 1 and charged via wireless charging.

FIG. 2 is a schematic diagram of a mobile network 60 according to one embodiment. The mobile network 60 includes a signal booster system 50, a base station 51, and mobile devices 53a-53c (three shown, in this example). The signal booster system 50 includes an indoor antenna unit 41, an outdoor signal booster 42, a power and RF cable 43 and a power cable 45. For clarity of the figures, internal circuitry and components of the indoor antenna unit 41 and the outdoor signal booster 42 are not shown in FIG. 2.

The signal booster system 50 is implemented in accordance with one or more of the features as described herein. For example, the indoor antenna unit 41, the outdoor signal booster 42, the power and RF cable 43, and/or the power cable 45 can include one or more features described above with respect to the signal booster systems of FIGS. 1A and 1B.

In the illustrated embodiment, the outdoor signal booster 42 including an integrated base station antenna and booster circuitry is mounted on a roof 55 of a building 52. The outdoor signal booster 42 can be attached to the roof 55 in a wide variety of ways, such as by using a wide variety of mounts and/or fasteners. Although FIG. 2 illustrates an example in which the outdoor signal booster 42 is attached to a top of the roof 55, the teachings are applicable to configuration in which an outdoor signal booster is attached to other surfaces of a building, including, but not limited to, an exterior surface of a wall.

In certain implementations, the integrated base station antenna of the outdoor signal booster 42 is an omnidirectional antenna operable to transmit and receive signals a full 360 degrees around a perimeter of a building. In other implementations, the base station antenna is a directional antenna, such as a Yagi antenna, that is pointed in a direction of a particular base station.

Accordingly, the illustrated embodiment achieves the advantages of robust communication between the base station 51 and the outdoor base station antenna while also achieving high transmit power and receiver sensitivity relative to an implementation in which an indoor signal booster connects to an outdoor base station antenna via a cable.

In certain implementations, structures of a building are advantageously used to provide shielding or isolation between outdoor base station antenna and the indoor mobile station antenna. For example, a building's roof and/or walls can serve as a reflector or isolator for providing antenna-to-antenna isolation. In certain implementations, the outdoor signal booster 42 and/or indoor antenna unit 41 can further include an explicit isolator configured to provide additional antenna-to-antenna isolation.

The indoor antenna unit 41 includes an integrated mobile station antenna. Although illustrated as being placed on a desk, the indoor antenna unit 41 can be placed and/or attached to a wide variety of surfaces in the interior of the building 52. In another embodiment, the indoor antenna unit 1 can be omitted in favor of a mobile station antenna that is not integrated with an indoor antenna unit.

In certain implementations, the indoor mobile station antenna of the indoor antenna unit 41 is an omnidirectional or directional antenna configured to primarily radiate within an interior of the building 52. Thus, the indoor mobile station antenna can communicate with mobile devices within the building 52, such as mobile devices 53a-53c.

As shown in FIG. 2, the indoor antenna unit 41 receives power from a building power source (for instance, an AC outlet 54) over the power cable 45. Additionally, the power and RF cable 43 is used both for communicating RF signals between the indoor antenna unit 41 and the outdoor signal booster 42 and for supplying the outdoor signal booster 42 with power. In certain implementations, indoor antenna unit 41 and/or a power adapter of the power cable 45 provides AC to DC conversion.

The signal booster system 50 can be implemented using any suitable combination of features disclosed herein.

Although the mobile network 60 illustrates an example with three mobile devices and one base station, the mobile network 60 can include base stations and/or mobile devices of other numbers and/or types. For instance, mobile devices can include mobile phones, tablets, laptops, wearable electronics (for instance, smart watches), and/or other types of user equipment (UE) suitable for use in a wireless communication network.

Although an example with a home is shown, a signal booster system can be installed in a variety of types of buildings, such as homes, offices, commercial premises, factories, garages, barns, and/or any other suitable building.

The outdoor signal booster 42 can retransmit signals to and receive signals from the base station 51 using the booster's integrated base station antenna. Additionally, the indoor antenna unit 41 can retransmit signals to and receive signals from the mobile devices 53a-53c using the unit's integrated mobile station antenna.

The outdoor signal booster 42 can be used to communicate in a variety of types of networks, including, but not limited to, networks operating using FDD, TDD, or a combination thereof.

As a network environment changes, the outdoor signal booster 42 can communicate with different base stations. Thus, it will be understood that base station 51 represents a particular base station or group of base stations that the signal booster system 50 is in communication with at a particular time.

Thus, although FIG. 2 illustrates the outdoor signal booster 42 as communicating with one base station 51, the outdoor signal booster 42 can communicate with multiple base stations. For example, the outdoor signal booster 42 can be used to communicate with base stations associated with different cells of a network and/or with base stations associated with different networks, such as networks associated with different wireless carriers and/or frequency bands.

In certain implementations, the mobile devices 53a-53c can communicate at least in part over multiple frequency bands, including one or more cellular bands such as, Band II, Band IV, Band V, Band XII, and/or Band XIII. For instance, in one example, the first mobile device 53a can operate using Advanced Wireless Services (AWS) (Band IV), the second mobile device 53b can operate using Personal Communication Services (PCS) (Band II), and the third mobile device 53c can operate using Cellular services (Band V). Furthermore, in certain configurations, all or a subset of the mobile devices 53a-53c can communicate using Long Term Evolution (LTE), and may transmit and receive Band XII signals, Band XIII signals, and/or other signals associated with LTE. The teachings herein are also applicable to communications using carrier aggregation, including those associated with 4.5G, 5G technologies, and other emerging mobile communication technologies.

Although specific examples of frequency bands and communication technologies have been described above, the teachings herein are applicable to a wide range of frequency bands and communications standards. For example, signal boosters can be used to boost a wide variety of bands, including, but not limited to, 2G bands, 3G bands (including 3.5G bands), 4G bands (including 4.5G bands), 5G bands, Wi-Fi bands (for example, according to Institute of Electrical and Electronics Engineers 802.11 wireless communication standards), and/or digital television bands (for example, according to Digital Video Broadcasting, Advanced Television System Committee, Integrated Services Digital Broadcasting, Digital Terrestrial Multimedia Broadcasting, and Digital Multimedia Broadcasting standards).

Accordingly, the signal booster system 50 can be configured to boost signals associated with multiple frequency bands so as to improve network reception for each of the mobile devices 53a-53c. Configuring the signal booster system 50 to service multiple frequency bands can improve network signal strength. For example, the signal booster system 50 can improve network signal strength of devices using the same or different frequency bands, the same or different wireless carriers, and/or the same or different wireless technologies. Configuring the signal booster system 50 as a multi-band booster can avoid the cost of separate signal boosters for each specific frequency band and/or wireless carrier.

FIG. 3A is a side view of one embodiment of an outdoor signal booster 130. The outdoor signal booster 130 includes a housing 102, a cable port 103, a circuit board 111, an isolator 112, and an outdoor base station antenna 116. The outdoor signal booster 130 is securable to a building surface using any suitable mounting and/or fastening structures (not illustrated in FIG. 3A).

The circuit board 111 includes circuitry and electronic components of the outdoor signal booster 130, such as booster circuitry, a signal conversion circuit, a DC/RF separator, a temperature detector, and/or an external antenna detector. In the illustrated embodiment, the outdoor base station antenna 116 is within the housing 102 of the outdoor signal booster 130. However, other implementations are possible, such as configurations in which an outdoor base station antenna extends from the housing 102. In the illustrated embodiment, the outdoor base station antenna 116 is an omnidirectional antenna, which can be used to communicate a full 360 degrees around a perimeter of a building when unobstructed. Although one implementation of an outdoor base station antenna is shown, other implementations of outdoor base station antennas can be used in accordance with the teachings herein. Furthermore, multiple base station antennas can be included.

In the illustrated embodiment, the outdoor base station antenna 116 is substantially perpendicular to the circuit board 111, and isolated from the circuit board 111 by the isolator or RF shield 112. Implementing an outdoor signal booster in this manner provides robust base station communications while isolating the outdoor base station antenna 116 from noise and/or interference of the circuit board 111. In certain implementations, the RF shield 112 can include an enclosure (for instance, a lid) covering at least a portion of the circuit board 111.

The outdoor signal booster 130 can be conveniently installed in a wide range of building surfaces.

The housing 102 is used to house the circuitry of the outdoor signal booster 130. In certain implementations, the housing includes a UV resistant coating or film for heat reduction and/or a seal coating or film for moisture, humidity, and/or corrosion protection.

In certain implementations, the housing 102 is cylindrical-shaped. However, the housing 102 can have other shapes. The housing 102 can be made of a wide variety of materials, including, but not limited to, plastic and/or a metal, such as stainless steel.

In the illustrated embodiment, the outdoor signal booster 130 includes a cable port 103 that is connectable to a cable. The outdoor signal booster 130 communicates with an indoor antenna unit via the cable. In one example, the cable port 103 receives a shared DC power and RF cable used for carrying RF and DC power. In another example, the cable port 103 receives a complex cable bundling an RF cable and a power cable. In yet another example, the outdoor signal booster 130 is connected to multiple cables, such as an RF cable and a separate power cable (DC and/or AC). In certain implementations, the port 103 is associated with a pluggable cable. In other implementations, the cable is secured to the port 103 to prevent removal.

FIG. 3B is a side view of another embodiment of an outdoor signal booster 140. The outdoor signal booster 140 of FIG. 3B is similar to the outdoor signal booster 130 of FIG. 3A, except that the outdoor signal booster 140 of FIG. 3B includes a Yagi antenna 136 and a housing 132 of a different shape. In certain implementations, an outdoor signal booster includes a directional antenna, such as the Yagi antenna 136.

FIG. 3C is a side view of another embodiment of an outdoor signal booster 150. The outdoor signal booster 150 of FIG. 3C is similar to the outdoor signal booster 130 of FIG. 3A, except that the outdoor signal booster 150 of FIG. 3C further includes an umbrella 141, which can aid in limiting sun exposure to the housing 102, thereby providing protection against heat. Additionally, the outdoor signal booster 150 further includes a heat sink 142 and fans 143 within the housing 102. Including one or more umbrellas, heat sinks, and/or fans provides an outdoor signal booster with enhanced robustness against overheating. The circuit board 111 includes circuitry and electronic components of the outdoor signal booster 150, which can include, for example, a temperature detector. Although one embodiment of a signal booster implemented with overheating protection is shown, a wide variety of overheating protection structures and/or materials can be used. In one example, the outdoor signal booster 150 includes a shell coating, such as a UV coating or other suitable coating for enhancing protection from overheating. In another example, the outdoor signal booster 150 includes at least one of a sun visor or solar reflector (also referred to herein as a solar mirror).

FIG. 3D is a side view of another embodiment of an outdoor signal booster 160. The outdoor signal booster 160 includes a housing 102 and a base station antenna 156 extending from the housing 102. The circuit board 111 and RF shield 112 are within the housing 102, which includes a cable port 103 thereon for connecting to a cable. In the illustrated embodiment, a shell coating 151 is included on the housing 102 for heat protection. The shell coating 151 corresponds to a UV coating or other suitable coating for enhancing protection from overheating.

FIG. 3E is a side view of another embodiment of an outdoor signal booster 170. The outdoor signal booster 170 of FIG. 3E is similar to the signal booster 130 of FIG. 3A, except that the outdoor signal booster 170 further includes a solar visor or solar hat 161.

FIG. 3F is a side view of another embodiment of an outdoor signal booster 180. The outdoor signal booster 180 of FIG. 3F is similar to the signal booster 130 of FIG. 3A, except that the outdoor signal booster 180 further includes a solar mirror or solar reflector 171.

Figure 4A:
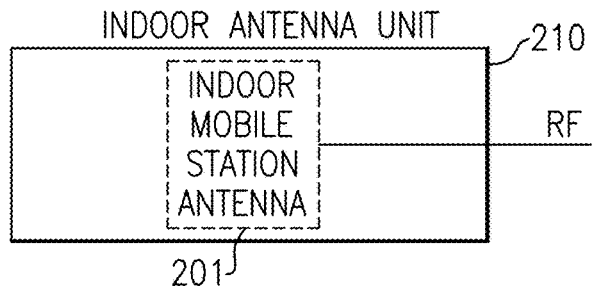
FIG. 4A is a schematic diagram of an indoor antenna unit according to one embodiment.

FIG. 4A is a schematic diagram of an indoor antenna unit 210 according to one embodiment. The indoor antenna unit 210 includes an integrated indoor mobile station antenna 201 that is connectable to an outdoor signal booster via an RF cable.

Figure 4B:
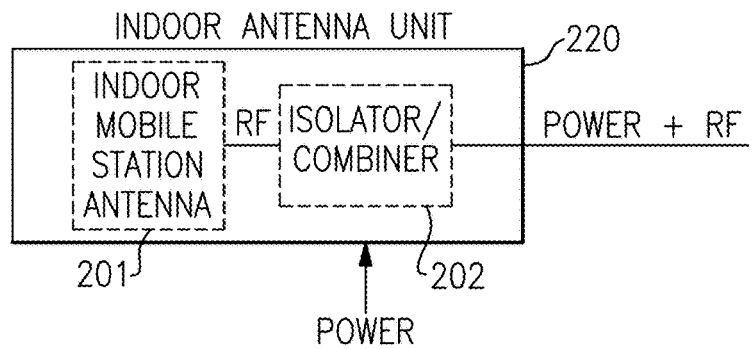
FIG. 4B is a schematic diagram of an indoor antenna unit according to another embodiment.

FIG. 4B is a schematic diagram of an indoor antenna unit 220 according to another embodiment. The indoor antenna unit 220 includes an indoor mobile station antenna 201, which is integrated therewith. Additionally, the indoor antenna unit 220 includes an isolator/combiner circuit 202, which is used to combine power and RF onto a shared cable while providing isolation. For example, the isolator/combiner circuit 202 can be used to superimpose an RF signal onto the DC supply voltage. By implementing the indoor antenna unit 220 in this manner, a shared cable can be used for carrying RF signals and for powering a signal booster.

Figure 4C:
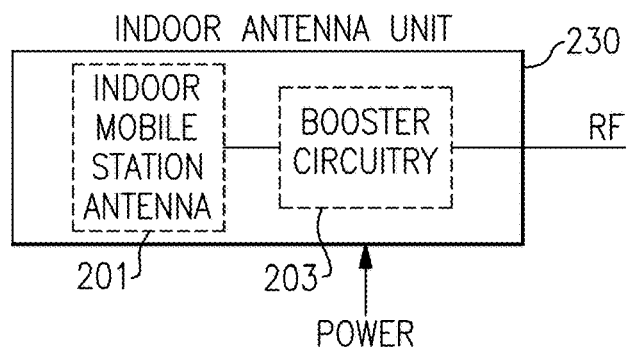
FIG. 4C is a schematic diagram of an indoor antenna unit according to another embodiment.

FIG. 4C is a schematic diagram of an indoor antenna unit 230 according to another embodiment. The indoor antenna unit 230 includes an indoor mobile station antenna 201 and booster circuitry 203. Additionally, the indoor antenna unit 230 is connectable to an outdoor signal booster via an RF cable. The booster circuitry 203 of the indoor antenna unit 230 aids in sending RF signals to and received RF signals form a signal booster. Accordingly, in certain implementations herein, booster circuitry is included not only in an outdoor signal booster, but also in an indoor antenna unit. The booster circuitry 203 can be implemented in accordance with any of the embodiments herein.

Figure 4D:
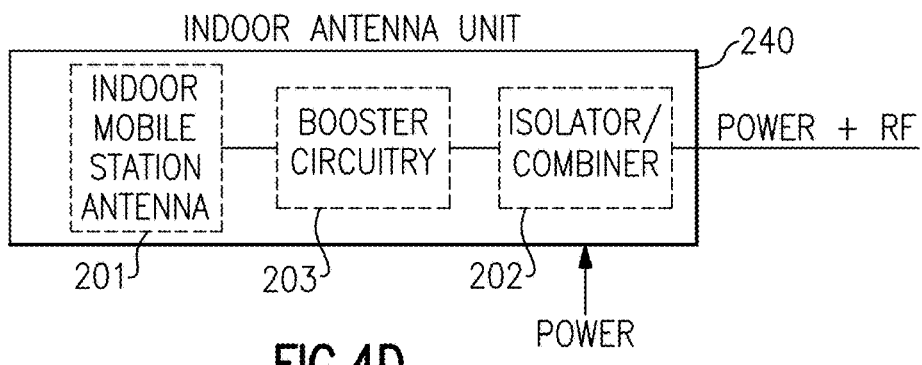
FIG. 4D is a schematic diagram of an indoor antenna unit according to another embodiment.

FIG. 4D is a schematic diagram of an indoor antenna unit 240 according to another embodiment. The indoor antenna unit 240 includes an indoor mobile station antenna 201, an isolator/combiner circuit 202, and booster circuitry 203. Additional details of the indoor antenna unit 240 can be as described above.

The signal booster systems herein provide signal boosting for user equipment (UE) of a cellular network.

Another type of wireless network is a wireless local area network (WLAN), which allows wireless clients to wirelessly connect to a local area network. WLANs can provide a connection through an access point to the wider internet, thereby allowing clients to move within a local coverage area while maintaining an internet connection.

One example of WLANs is Wi-Fi networks as specified by the Institute of Electrical and Electronics Engineers (IEEE) 802.11 wireless communication standards. Examples of Wi-Fi frequency bands include low band Wi-Fi in the 2.4 GHz frequency block and high band Wi-Fi in the 5 GHz frequency block.

A wide variety of types of wireless clients can connect to WLANs. For instance, wireless clients can include certain types of cellular UE that is also WLAN enabled, such as certain mobile phones, tablets, laptops, and/or wearable electronics. Wireless clients can also include other types of WLAN enabled devices, such as desktops, workstations, and/or smart electronics (for instance, consumer electronics, such as televisions).

WLAN networks include access points (APs) that serve to transmit and receive WLAN signals to thereby communicate with wireless clients. For example, an AP of a Wi-Fi network allows Wi-Fi enabled devices to wirelessly connect to a wired network.

In certain implementations herein, an indoor antenna unit serves not only for communicating with UE of a cellular network, but also as an AP for a WLAN network, such as a Wi-Fi network.

Accordingly, in certain implementations the integrated antenna unit serves to transmit a boosted RF downlink signal to UE and to receive an RF uplink signal from the UE, thereby providing enhanced cellular coverage indoors. Furthermore, the integrated wireless access device serves as an access point for the WLAN network. Accordingly, both cellular UE and WLAN wireless clients are provided with simultaneous access to both a cellular network and a WLAN network using the integrated wireless access device. Thus, the teachings herein can be used to integrate an indoor cellular antenna of a cellular signal booster system with a WLAN AP into a common housing.

Figure 5A:
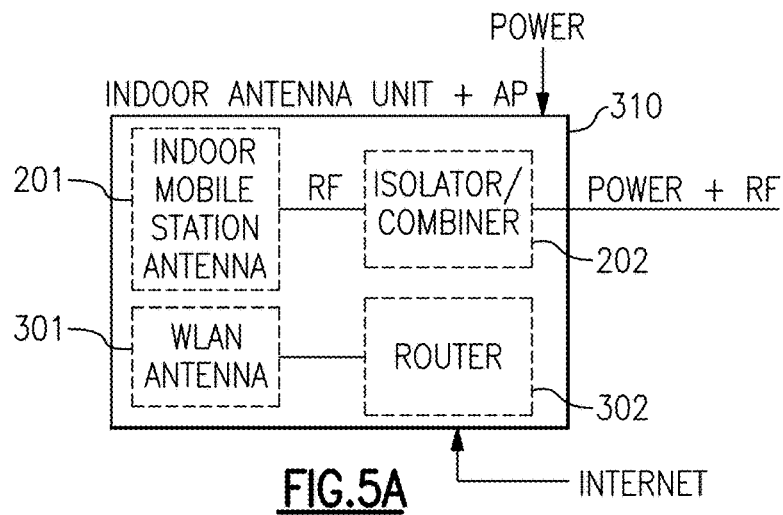
FIG. 5A is a schematic diagram of an indoor antenna unit with WLAN access point according to one embodiment.

FIG. 5A is a schematic diagram of an indoor antenna unit 310 with WLAN access point according to one embodiment. The indoor antenna unit 310 includes an indoor mobile station antenna 201 and an isolator/combiner circuit 202 for processing cellular signals. The indoor antenna unit 310 further includes a WLAN antenna 301 and a router 302 for processing WLAN signals.

Although an implementation of cellular signal processing similar to that shown in FIG. 4B is shown, an indoor antenna unit with WLAN access point can include any suitable circuitry for cellular signal processing, including, but not limited to, any of the configurations shown in FIGS. 4A-4D.

With continuing reference to FIG. 5A, the router 302 is connected to the Internet via a wired connection, in this embodiment. In one example, the indoor antenna unit 310 includes a WAN port for receiving an Ethernet cable for connecting to the Internet. The router 302 communicates with the WLAN antenna 301 to provide wireless clients with Internet access. Accordingly, both cellular and WLAN signal service (for instance, Wi-Fi) can be provided over the air at the same time to occupants of the building.

In the illustrated embodiment, cellular signals and WLANs are communicated using separate antennas. In other implementations, the indoor antenna unit also uses the cellular antenna to communicate WLAN signals with wireless clients. In such implementations, both cellular signals and WLAN signals can be transmitted and/or received using one or more shared antennas. In one example, the integrated wireless access device includes a wideband antenna operable over a broad frequency range, for instance, over at least frequencies ranging from 698 MHz to 5.9 GHz to provide coverage of a variety of cellular and Wi-Fi bands. Additionally, the integrated wireless access device can include a combiner (for instance, a diplexer or triplexer) for combining cellular and WLAN signals communicated over the wideband antenna.

In certain implementations, multiple WLAN antennas are provided. For example, in certain implementations, an integrated signal booster supports dual band Wi-Fi and/or multiple spatial streams to provide diversity, such as multiple-input multiple-output (MIMO) communications. For example, a first pair of Wi-Fi antennas can operate to transmit and receive low band Wi-Fi data streams to provide low band Wi-Fi MIMO, while a second pair of Wi-Fi antennas can operate to transmit and receive high band Wi-Fi data streams to provide high band Wi-Fi MIMO.

Figure 5B:
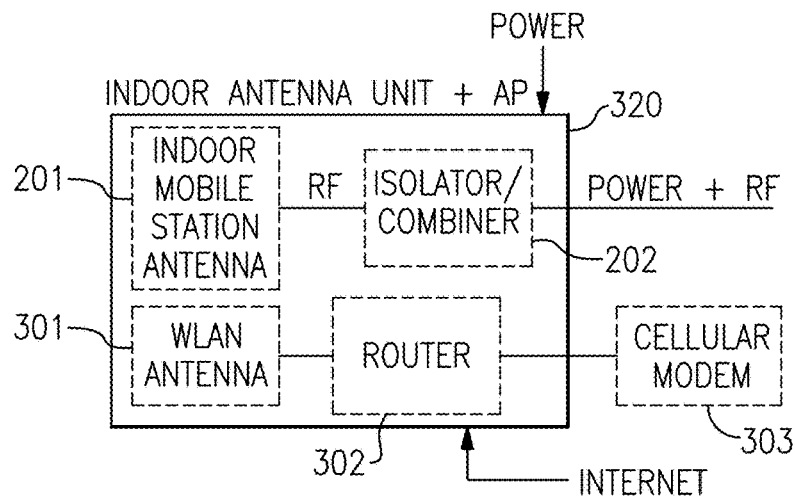
FIG. 5B is a schematic diagram of an indoor antenna unit with WLAN access point according to another embodiment.

FIG. 5B is a schematic diagram of an indoor antenna unit 320 with WLAN access point according to another embodiment. The indoor antenna unit 320 of FIG. 5B is similar to the indoor antenna unit 310 of FIG. 5A, except that the indoor antenna unit 320 is implemented to further connect to a cellular modem 303.

The cellular modem 303 can provide Internet connectivity via a cellular connection, such as 3G, 4G, LTE, and/or 5G. The cellular modem 303 can include its own antenna for cellular data communication.

The cellular modem 303 provides Internet connectivity to the indoor antenna unit 320 when the wired Internet connection is down or otherwise unavailable. For example, a USB broadband adapter or other cellular modem 303 can be connected when desired by a user, for instance, by plugging the cellular modem 303 into a USB or other port.

Figure 5C:
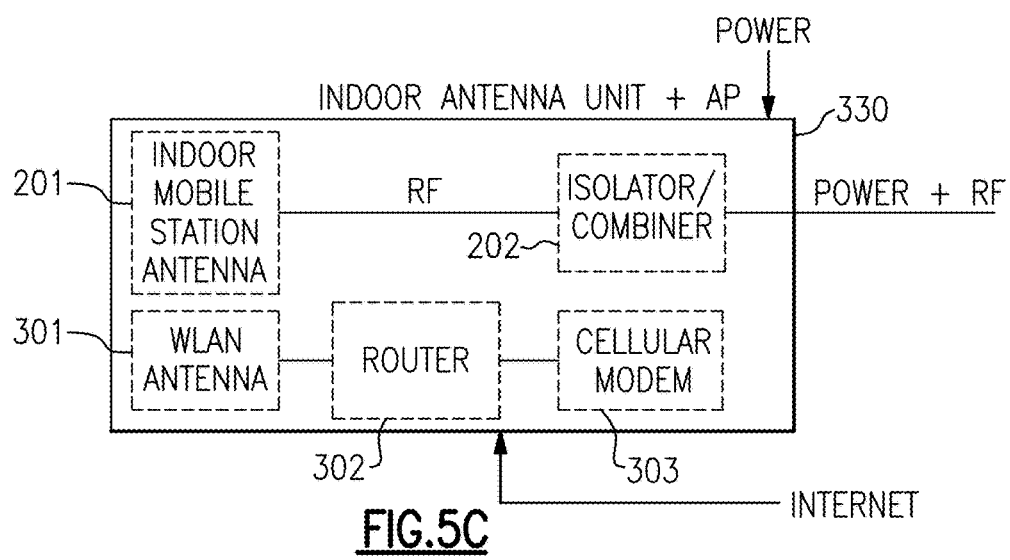
FIG. 5C is a schematic diagram of an indoor antenna unit with WLAN access point according to another embodiment.

FIG. 5C is a schematic diagram of an indoor antenna unit 330 with WLAN access point according to another embodiment. The indoor antenna unit 330 of FIG. 5C is similar to the indoor antenna unit 320 of FIG. 5B, except that the indoor antenna unit 330 illustrates a configuration in which the cellular modem 303 is integrated with the indoor antenna unit 330.

Figure 6:
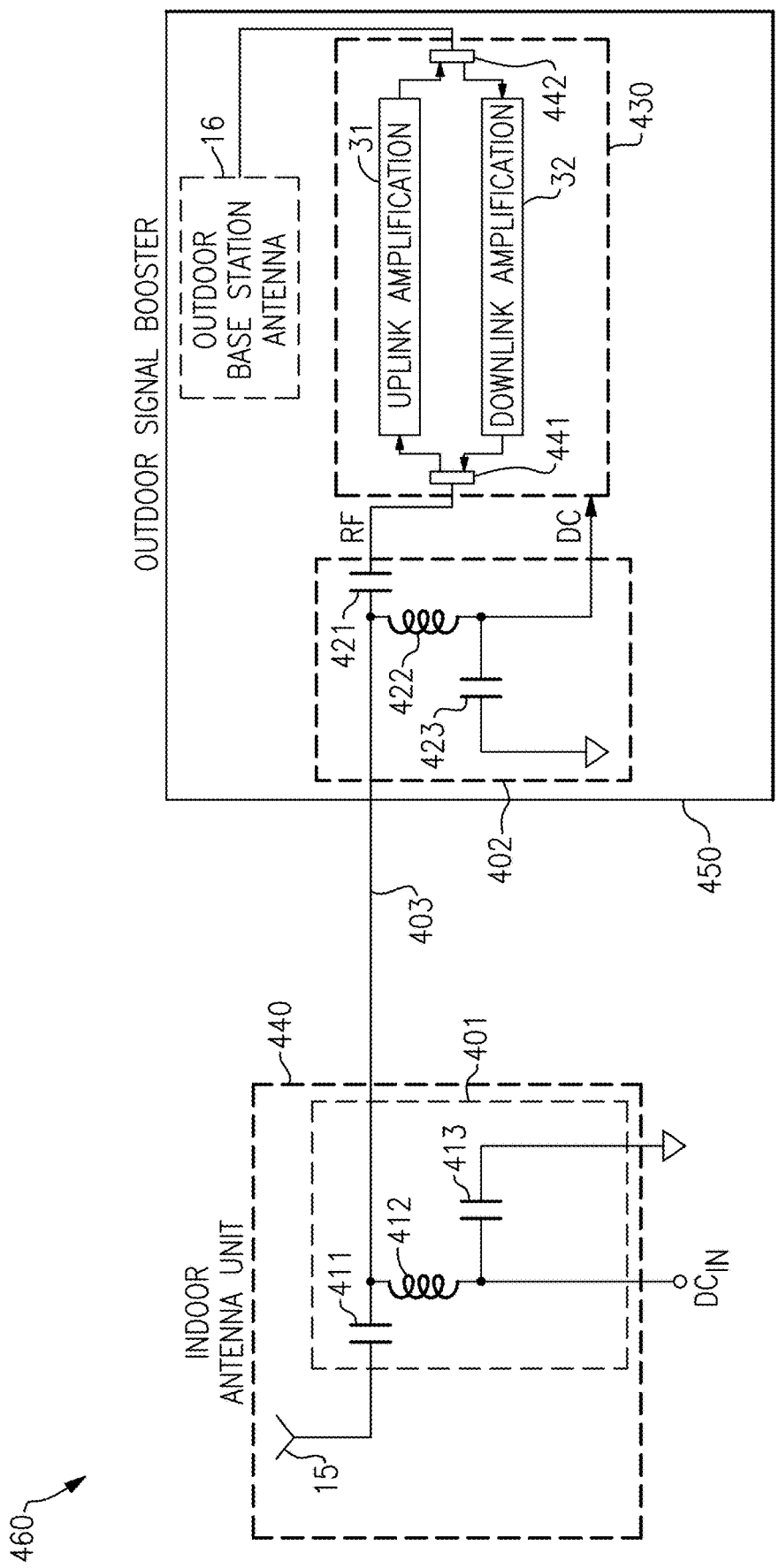
FIG. 6 is a schematic diagram of a signal booster system including circuitry for connecting to a shared DC power and RF cable, according to another embodiment.

FIG. 6 is a schematic diagram of a signal booster system 460 including circuitry for connecting to a shared DC power and RF cable, according to another embodiment. As shown in FIG. 6, the signal booster system 460 includes a shared DC power and RF cable 403, an indoor antenna unit 440, and an outdoor signal booster 450.

The indoor antenna unit 440 of FIG. 6 is similar to the indoor antenna unit 1 of FIG. 1B, except that the indoor antenna unit 410 further includes an isolator/combiner circuit 401, which corresponds to one embodiment of the DC/RF combiner 23 of FIG. 1B. As shown in FIG. 6, the isolator/combiner circuit 401 includes a DC blocking capacitor 411, an RF choke inductor 412 and a decoupling capacitor 413. The isolator/combiner circuit 401 serves to combine a DC input voltage $DC_{IN}$ with an RF signal associated with the indoor mobile station antenna 15 while providing isolation.

The outdoor signal booster 450 of FIG. 6 is similar to the outdoor signal booster 12 of FIG. 1B, except that the outdoor signal booster 450 includes an isolator/separator circuit 402, which corresponds to one embodiment of the DC/RF separator 24 of FIG. 1B. The isolator/separator circuit 402 includes a DC blocking capacitor 421, an RF choke inductor 422 and decoupling capacitor 423.

The outdoor signal booster 450 of FIG. 6 also includes booster circuitry 430, which corresponds to one implementation of the booster circuitry 21 of FIG. 1B. The booster circuitry 430 includes a first splitting/combining structure 441, which can include one or more multiplexers, one or more diplexers, and/or other suitable components for splitting and combining RF signals. The booster circuit 430 further includes a second splitting/combining structure 442, an uplink amplification circuit 31, and a downlink amplification circuit 32. The isolator/separator circuit 402 provides DC power to the indoor antenna unit 440.

As shown in FIG. 6, the first splitting/combining structure 441 includes a first terminal electrically connected to an input terminal of the uplink amplification circuit 31, a second terminal electrically connected to an output terminal of the downlink amplification circuit 32, and an antenna terminal electrically connected to the indoor mobile station antenna 15 by way of the isolator/separator circuit 402, the shared DC power and RF cable 403, and the isolator/combiner circuit 401. Additionally, the second splitting/combining structure 442 includes a first terminal electrically connected to an output terminal of the uplink amplification circuit 31, a second terminal electrically connected to an input terminal of the downlink amplification circuit 32, and an antenna terminal electrically connected to the outdoor base station antenna 16.

With continuing reference to FIG. 6, the shared DC power and RF cable 403 carries an RF voltage superimposed on a DC supply voltage. Thus, the shared DC power and RF cable 403 carries DC power provided at the input $DC_{IN}$ to the outdoor signal booster 403 as well as RF signals associated with communications of the indoor mobile station antenna 15. In certain implementations, the input $DC_{IN}$ receives a DC voltage generated from a building's power source.

Although one embodiment of circuitry for connecting to a shared DC power and RF cable is shown, other implementations are possible.

Figure 7A:
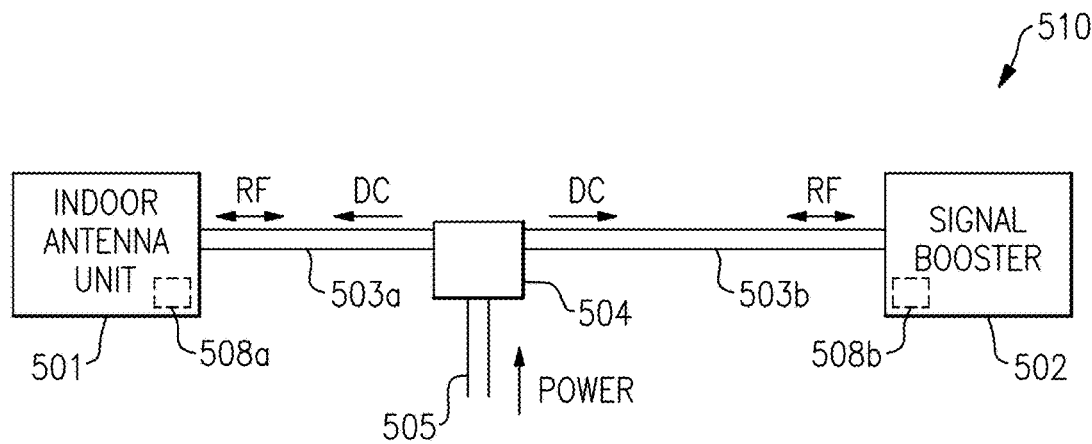
FIG. 7A is a schematic diagram of a signal booster system according to another embodiment.

FIG. 7A is a schematic diagram of a signal booster system 510 according to another embodiment. The signal booster system 510 includes an indoor antenna unit 501, a signal booster 502, a first shared DC power and RF cable 503a, a second shared DC power and RF cable 503b, an isolator/combiner circuit 504, and a power cable 505. In certain implementations, the signal booster 502 is an outdoor signal booster. Although illustrated as two separate cables 503a, 503b, in certain implementations a singled shared DC power and RF cable is used and the isolator/combiner circuit 504 serves to inject DC power into a conductor of the shared cable. Accordingly, in certain implementations, the first shared DC power and RF cable 503a and the second shared DC power and RF cable 503b correspond to a first cable section and a second cable section.

In the illustrated embodiment, the isolator/combiner circuit 504 provides DC power to the indoor antenna unit 501 and the signal booster 502, and is separated therefrom. In certain implementations, the isolator/combiner circuit 504 includes an inductor for providing a DC voltage to the cables 503a, 503b while choking or blocking RF signals to provide isolation. For example, the inductor can include a first end that receives a DC voltage and a second end that provides DC power to the cables 503a, 503b. Thus, RF uplink signals can be sent from the indoor antenna unit 501 to the signal booster 502 via the cable 503a, the isolator/combiner circuit 504, and the cable 503b. Additionally, RF downlink signals can be sent from the signal booster 502 to the indoor antenna unit 501 via the cable 503b, the isolator/combiner circuit 504, and the cable 503a.

The indoor antenna unit 501 operates with a single cable connected thereto, which can be desirable for certain applications. For example, the indoor antenna unit 501 can be set on a desktop, and it may be desirable to reduce cable congestion on the desktop. In one embodiment, the indoor antenna unit 501 includes a first isolator/separator 508a (for instance, a first instantiation of the isolator/separator circuit 402 of FIG. 6) and the signal booster 502 includes a second isolator/separator 508b (for instance, a second instantiation of the isolator/separator circuit 402 of FIG. 6).

Figure 7B:
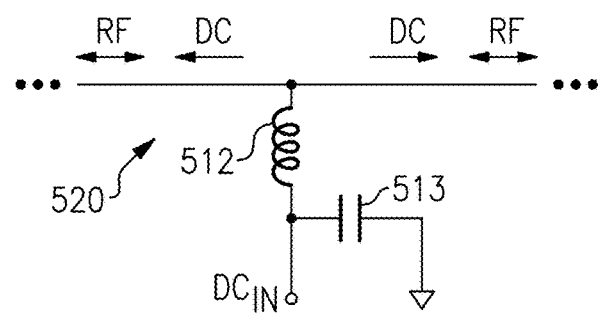
FIG. 7B is a schematic diagram of one embodiment of an isolator/combiner circuit.

FIG. 7B is a schematic diagram of one embodiment of an isolator/combiner circuit 520. The isolator/combiner circuit 520 illustrates one embodiment of the isolator/combiner circuit 504 of FIG. 7A. However, the isolator/combiner circuit 504 of FIG. 7A can be implemented in other ways.

In the illustrated embodiment, the isolator/combiner circuit 520 includes an RF choke inductor 512 and a decoupling capacitor 513. The isolator/combiner circuit 520 serves to provide a DC input voltage $DC_{IN}$ to one or more cables while providing isolation.

Figure 8:
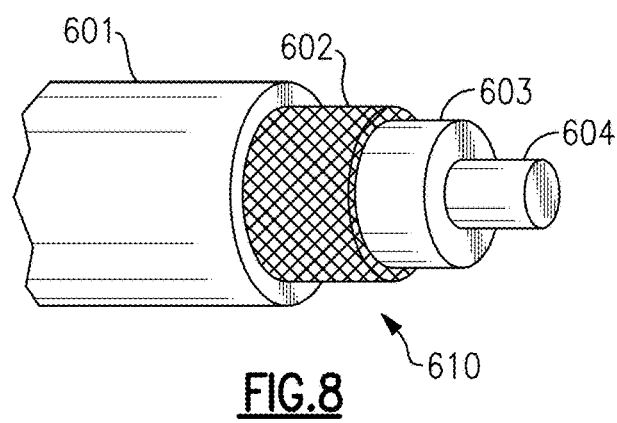
FIG. 8 is a perspective view of one example of a shared DC power and RF cable for a signal booster system.

FIG. 8 is a perspective view of one example of a shared DC power and RF cable 610 for a signal booster system. In this example, the shared DC power and RF cable 610 is implemented as a coaxial cable including outside insulation 601, metal mesh conductor 602, interior insulation 603, and metal inner conductor 604.

The outside insulation 601 protects the coaxial cable from external friction, interference, or damage. The metal mesh conductor 602 aids in containing signal leakage from metal inner conductor 604 and also shields the signal transmitted on the metal inner conductor 604 from external electric and/or magnetic fields while serving as ground.

In the illustrated embodiment, the metal mesh conductor 602 carries a ground voltage to an outdoor signal booster, and the metal inner conductor 604 carries an RF voltage superimposed on a DC supply voltage. Thus, a common conductor carries both DC power and RF signals, in this embodiment.

The shared DC power and RF cable 610 illustrates one embodiment of a shared DC power and RF cable that can be used for carrying both RF signals and DC supply voltage to an outdoor signal booster. In another embodiment, a pair of separate cables are physically bundled together (referred to herein as a complex cable) to carry RF and DC power, respectively. However, the teachings herein are application to other implementations of shared DC power and RF cables, as well as to signal booster systems that do not include a shared DC power and RF cable.

Figure 9:
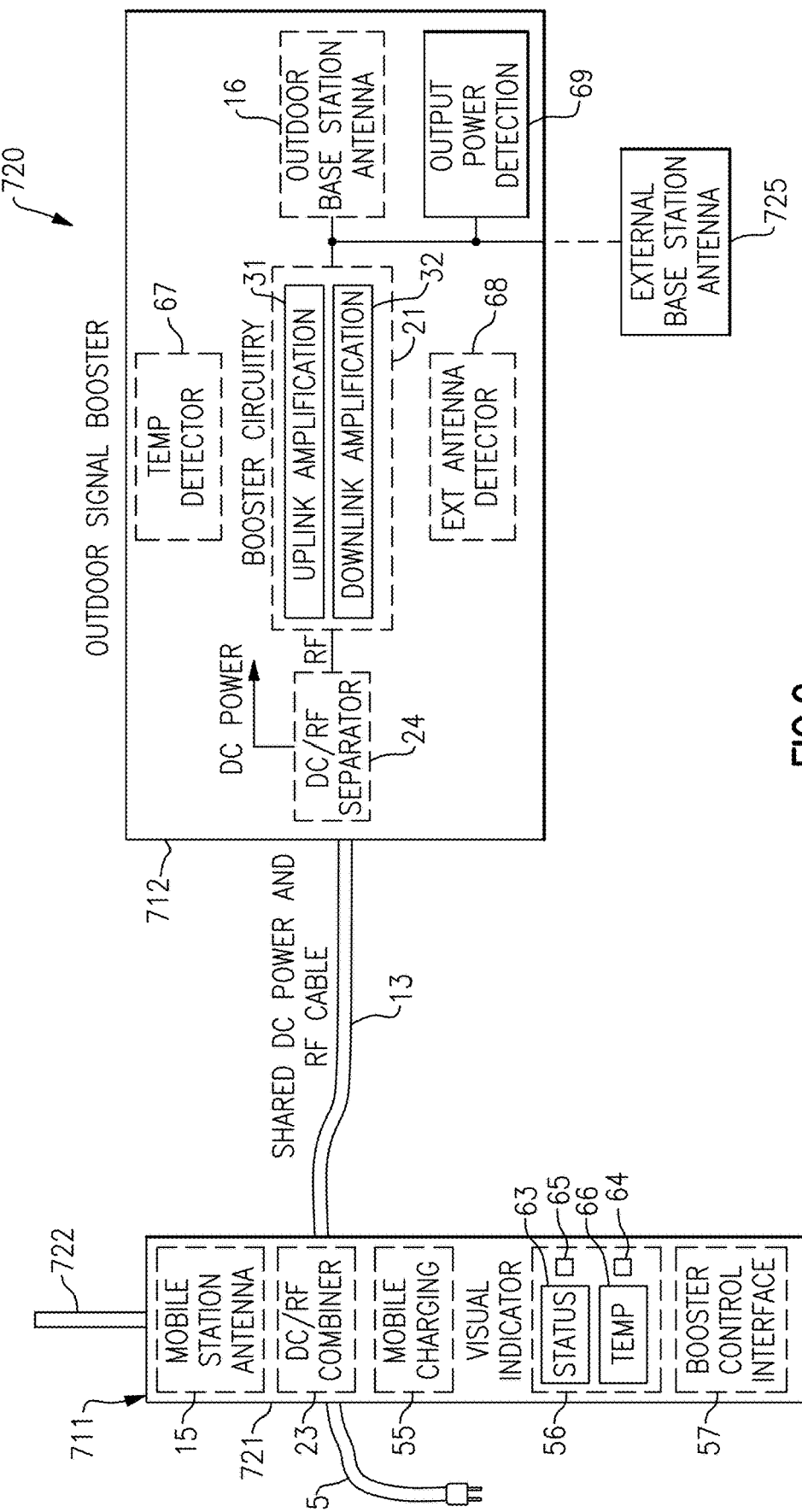
FIG. 9 is a schematic diagram of a signal booster system according to another embodiment.

FIG. 9 is a schematic diagram of a signal booster system 720 according to another embodiment. The signal booster system 720 includes a power cable 5, a shared DC power and RF cable 13, an indoor antenna unit 711, and an outdoor signal booster 712.

The indoor antenna unit 711 of FIG. 9 includes a housing 721, an indoor mobile station antenna 15, a DC/RF combiner 23, a mobile charging circuit 55, a visual indicator 56, and a booster control interface 57. In this embodiment, the mobile station antenna 15 is within the housing 721. However, other implementations are possible, such as configurations in which a mobile station antenna 722 is additionally or alternatively included, and extends from the housing 721 and/or is pluggable therein.

The mobile charging circuit 55 is operable to charge a battery of a user's mobile device. In one example, a charging cable is provided from the indoor antenna unit 711 to the mobile device, and the mobile charging circuit 55 charges the mobile device's battery via the charging cable. In another example, a mobile device can be coupled to the indoor antenna unit 711 and the mobile charging circuit 55 provides wireless charging.

The visual indicator 56 can include one or more displays, lights, or other visual indications to alert a user to the status of operation of the signal booster system 720. In one embodiment, the visual indicator 56 includes at least one of a light 65 (for instance, a light-emitting diode (LED)) or a display 66 (for instance, a liquid crystal display (LCD)).

In the illustrated embodiment, the visual indicator 56 includes a status indicator 63 and a temperature indicator 64. Although one example of visual indicators is shown, an indoor antenna unit can be configured to display other types of status information related to the operation of the signal booster system 720. The status indicator 63 indicates the status of the outdoor signal booster 720, including, but not limited to, whether the outdoor signal booster is powered, whether boosting is active for one or more bands, antenna status, and/or whether oscillation/pre-oscillation has occurred. The temperature indicator 64 indicates a temperature of the outdoor signal booster 712, as detected by the outdoor signal booster's temperature detector and/or whether the booster is operating with backed-off performance because of high temperature. In one embodiment, a temperature alarm is alerted by the temperature indicator 64 when a high temperature condition is present.

The booster control interface 57 can be used to control the outdoor signal booster 712 in a wide variety of ways. Examples of types of control provided by the booster control interface 57 include, but are not limited to, remote shutdown or power control, remote control of gain and/or attenuation (including, for example, band specific control), and/or remote control of antenna selection (for instance, in multi-antenna configurations). Including the booster control interface 57 allows a user indoors to control the outdoor signal booster 712 without needing to be physically present at the outdoor signal booster 712, which may be attached to a roof or wall that is inconvenient for the user to access.

The outdoor signal booster 712 of FIG. 9 is similar to the outdoor signal booster 12 of FIG. 1B, except that the outdoor signal booster 712 further includes a temperature detector 67 and an external antenna detector 68.

The temperature detector 67 detects the temperature of the outdoor signal booster 712. In one embodiment, when a high temperature condition is detected (for instance, a temperature of about 120 degrees Fahrenheit or higher), the outdoor signal booster 712 automatically adjusts performance (for instance, decreases gain) to protect from overheating. Such backed-off performance can be communicated to the user via the visual indicator 56. In certain implementations, the detected temperature is provided to a controller (for instance, control circuitry 908 of FIG. 12) and used for gain control.

The external antenna detector 68 detects whether or not an external base station antenna 725 has been connected to the outdoor signal booster. In one embodiment, when the external antenna detector 68 detects that the external base station antenna 725 is connected, the external antenna detector 68 disables the integrated base station antenna 16 in favor of using the external base station antenna 725 for communications. When the external base station antenna 725 is present, the outdoor signal booster 712 can detect output power of the antenna to ensure that output power does not exceed FCC EIRP limits and/or other emissions regulations or specifications. For example, in certain implementations, the outdoor signal booster 712 includes an output power detection component 69, which can include one or more directional couplers, one or more power detectors, one or more feedback paths, and/or other suitable circuitry for detecting output power. The detected power can be provided to a controller (for instance, control circuitry 908 of FIG. 12) and used for gain control.

Figure 10:
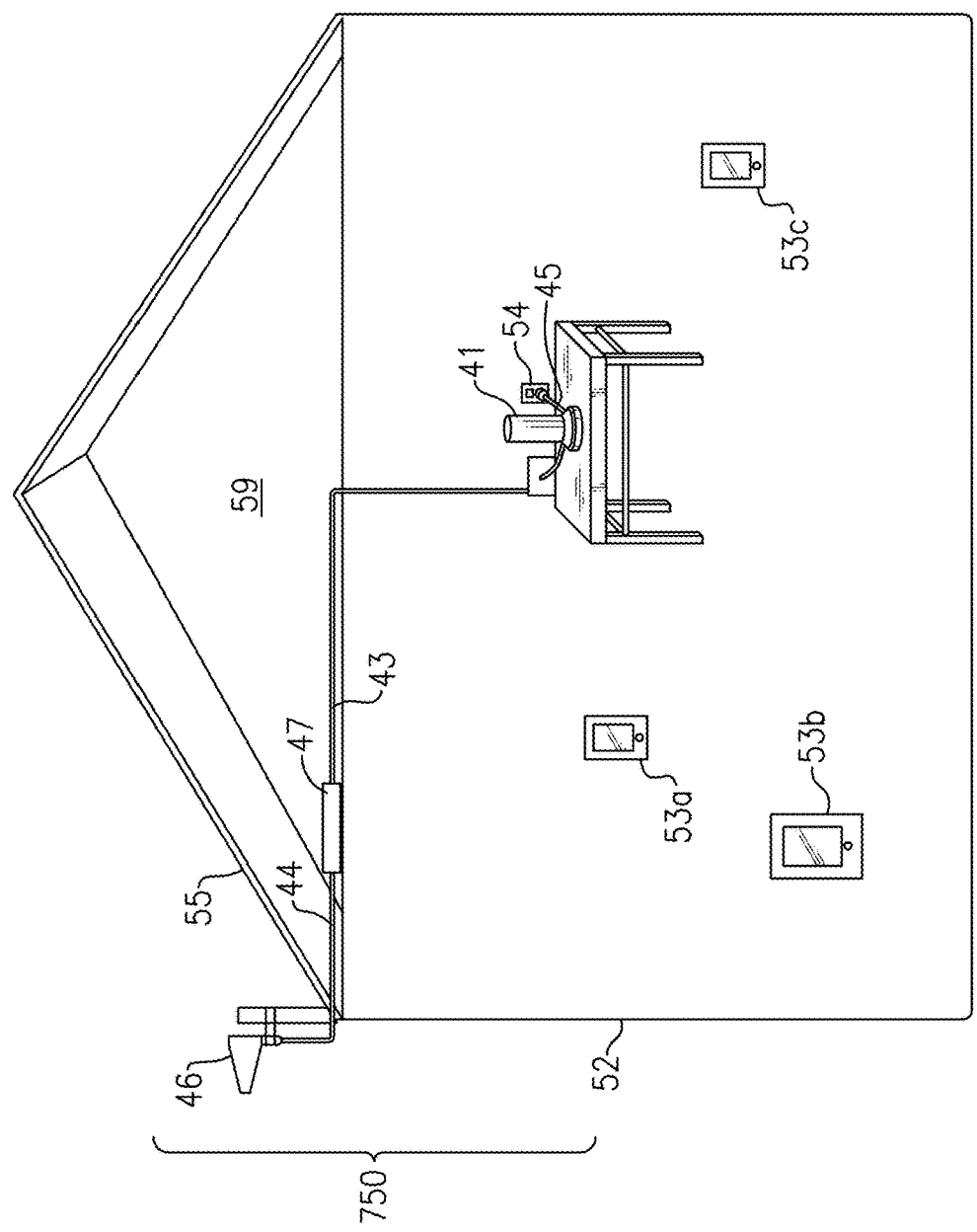
FIG. 10 is a schematic diagram of a mobile network according to another embodiment.

FIG. 10 is a schematic diagram of a mobile network 760 according to another embodiment. The mobile network 760 includes a signal booster system 750, a base station 51, and mobile devices 53a-53c (three shown, in this example). The signal booster system 750 includes an indoor antenna unit 41, a power and RF cable 43, a short base station antenna cable 44, a power cable 45, an outdoor base station antenna 46, and a signal booster 47. For clarity of the figures, internal circuitry and components of the indoor antenna unit 41 and the signal booster 47 are not shown in FIG. 10.

In the illustrated embodiment, the signal booster 47 is installed in an attic 59 of the building 52. Additionally, the signal booster 47 connects to the outdoor base station antenna 46 over the short base station antenna cable 44. In certain implementations, the short base station antenna cable 44 is less than about 5 feet and/or provides less than 1 dB of loss at the highest signal frequency of interest. In another embodiment, the base station antenna cable 44 is less than about 2 feet and/or provides less than 0.5 dB of loss at the highest signal frequency of interest.

Implementing the signal booster 47 in relatively close proximity to the outdoor base station antenna 46 can provide a number of advantages relative to a configuration in which a signal booster is far from a base station antenna. For example, a long cable connected from an indoor signal booster to an outdoor base station antenna can be several meters long, resulting in significant cable loss that degrades transmit power and/or receiver sensitivity. In contrast, the illustrated embodiment includes the signal booster 47 and outdoor base station antenna 46 in relatively close proximity and thus connected with low loss.

The power and RF cable 43 provides power to the signal booster 47, thereby enhancing convenience in applications in which a power outlet is not readily available near the signal booster 47.

Figure 11B:
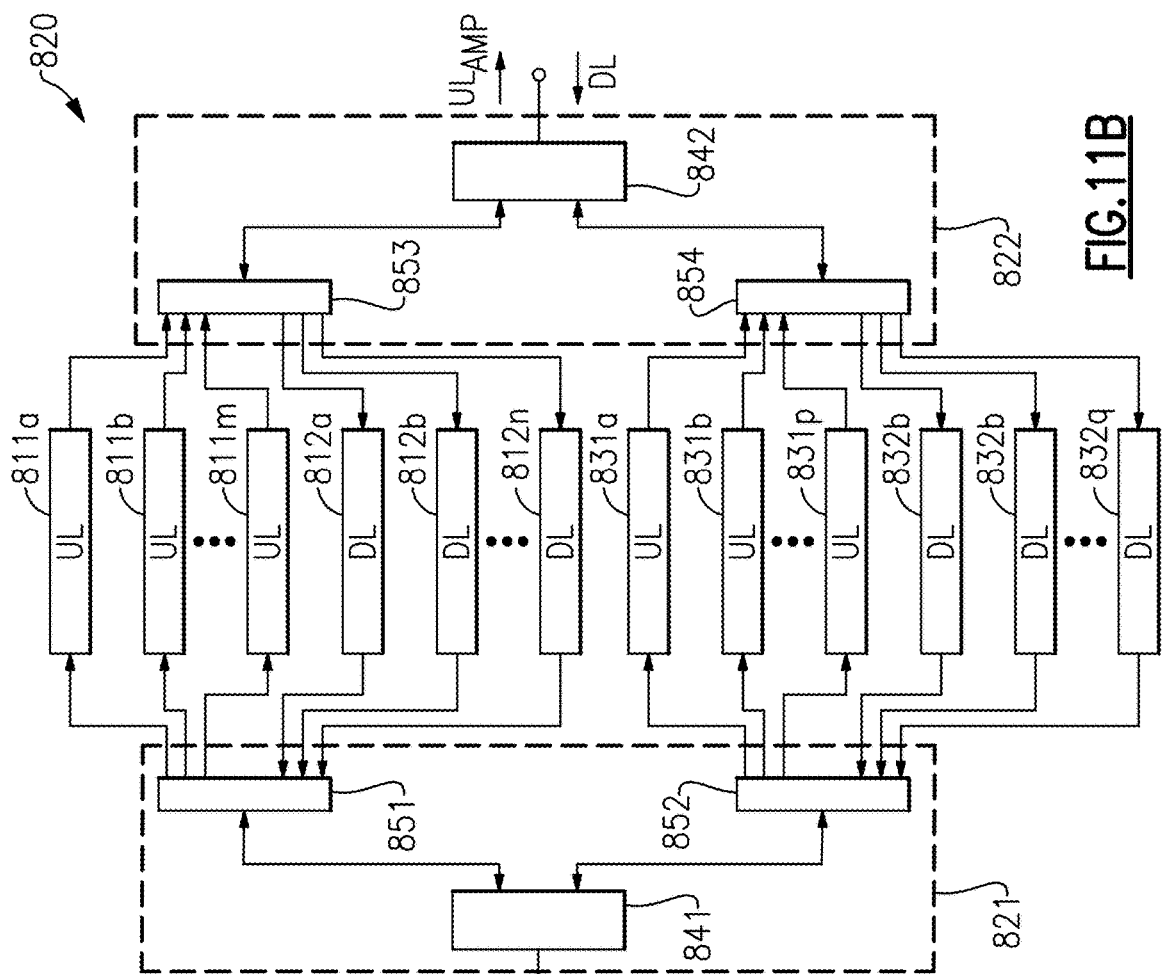
FIG. 11B is a schematic diagram of another embodiment of booster circuitry.
Figure 11A:
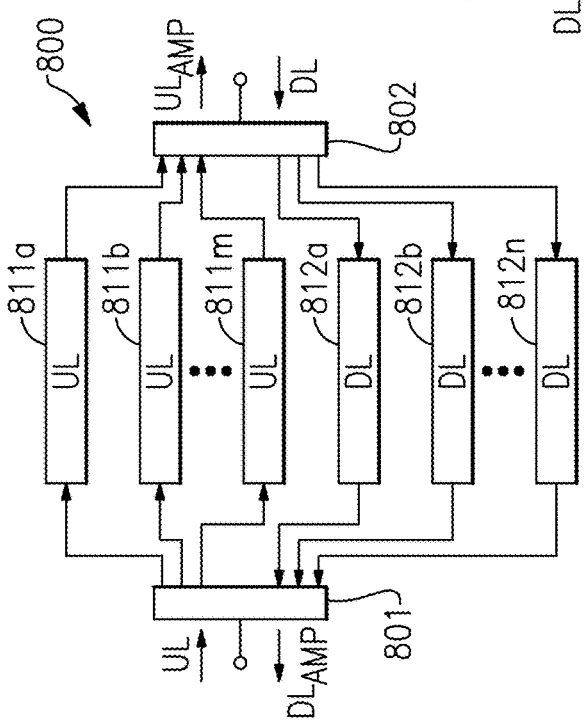
FIG. 11A is a schematic diagram of another embodiment of booster circuitry.

FIG. 11A is a schematic diagram of another embodiment of booster circuitry 800. The booster circuitry 800 of FIG. 11A corresponds to one embodiment of booster circuitry suitable for use in the signal booster systems disclosed herein. However, the signal booster systems herein can include other implementations of booster circuitry. The booster circuitry 800 can operate using a wide variety of frequency bands and communication standards including, but not limited to, any of the frequency bands and communications standards described herein.

In the illustrated embodiment, the booster circuitry 800 includes a first splitting/combining structure 801 and a second splitting/combining structure 802, which can be implemented in a wide variety of ways, including, but not limited to, using one or more multiplexers, one or more diplexers, and/or other suitable components for splitting and combining RF signals. The booster circuit 800 further includes a group of uplink amplification circuits 811a, 811b, . . . 811m and a group of downlink amplification circuits 812a, 812b, . . . 812n.

In this embodiment, m uplink amplification circuits and n uplink amplification circuits are included in the booster circuitry 800. The values of m and n can vary with application and/or implementation, and can be the same or different value.

As shown in FIG. 11A, the first splitting/combining structure 801 receives an uplink signal (UL) and outputs an amplified downlink signal ($DL_{AMP}$). Additionally, the second splitting/combining structure 802 receives a downlink signal (DL) and outputs an amplified uplink signal ($UL_{AMP}$).

In certain implementations, the first splitting/combining structure 801 splits the received uplink signal (UL) into multiple uplink channel signals associated with uplink channels of multiple frequency bands. For example, each uplink channel signal can have a frequency range corresponding to the frequency range of an uplink channel of a particular frequency band. Additionally, the uplink amplification circuits 811a, 811b, . . . 811m amplify the uplink channel signals to generate amplified uplink channel signals, which are combined by the second splitting/combining structure 802 to generate the amplified uplink signal ($UL_{AMP}$). Additionally, the second splitting/combining structure 802 splits the received downlink signal (DL) into multiple downlink channel signals associated with downlink channels of the frequency bands. For example, each downlink channel signal can have a frequency range corresponding to the frequency range of a downlink channel of a particular frequency band. Additionally, the downlink amplification circuits 812a, 812b, . . . 812n amplify the downlink channel signals to generate amplified downlink channel signals, which are combined by the first splitting/combining structure 801 to generate the amplified downlink signal ($DL_{AMP}$).

FIG. 11B is a schematic diagram of another embodiment of booster circuitry 820. The booster circuitry 820 of FIG. 11B corresponds to one embodiment of booster circuitry suitable for use in the signal booster systems disclosed herein. However, the signal booster systems herein can include other implementations of booster circuitry.

In the illustrated embodiment, the booster circuitry 820 includes a first splitting/combining structure 821, which includes a first diplexer 841, a first multiplexer 851, and a second multiplexer 852. Additionally, the booster circuitry 820 includes a second splitting/combining structure 822, includes a second diplexer 842, a third multiplexer 853, and a fourth multiplexer 854.

The booster circuit 820 further includes a first group of uplink amplification circuits 811a, 811b, . . . 811m, a first group of downlink amplification circuits 812a, 812b, . . . 812n, a second group of uplink amplification circuits 831a, 831b, . . . 831p, and a second group of downlink amplification circuits 832a, 832b, . . . 832q. The values of m, n, p, and q can vary with application and/or implementation, and can be the same or different value.

In certain implementations, the first group of uplink amplification circuits 811a, 811b, . . . 811m and the first group of downlink amplification circuits 812a, 812b, . . . 812n provide amplification to signals of one or more low frequency bands, such as frequency bands have a frequency of 1 GHz or less. Additionally, the second group of uplink amplification circuits 831a, 831b, . . . 831p and the second group of downlink amplification circuits 832a, 832b, . . . 832q provide amplification to signals of one or more high frequency bands, such as frequency bands have a frequency greater than 1 GHz.

Figure 12:
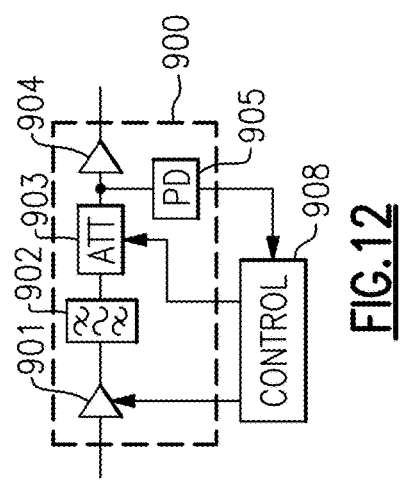
FIG. 12 is a schematic diagram of one embodiment of an amplification circuit.

FIG. 12 is a schematic diagram of one embodiment of an amplification circuit 900. The amplification circuit or path 900 of FIG. 12 illustrates one embodiment of an amplification circuit suitable for use as an uplink amplification circuit or downlink amplification circuit of a signal booster's booster circuitry. However, booster circuitry can include uplink and downlink amplification circuits implemented in a wide variety of ways. Accordingly, other implementations are possible.

In the illustrated embodiment, the amplification circuit 900 includes a low noise amplifier 901, a controllable attenuator 902, a band filter 903, a power amplifier 904, and a power detector 905.

In certain implementations, the detected power by the power detector 905 is provided to control circuitry 908 (for instance, a microprocessor, microcontroller, computer processing unit (CPU), and/or other suitable control circuitry). The control circuitry 908 can use the detected power for a wide variety of functions, including, but not limited to, power control (for instance, automatic gain control), oscillation detection, and/or shutdown. In certain implementations, the control circuitry also provides control over gain of components of one or more RF amplification paths. For example, the control circuitry can control the attenuation provided by controllable attenuation components (for instance, digital step attenuators and/or voltage variable attenuators) and/or the gain provided by controllable amplification circuits (for instance, variable gain amplifiers and/or programmable gain amplifiers).

In certain implementations, the control circuitry 908 is shared by multiple uplink amplification circuits and/or downlink amplification circuits. For example, the control circuitry 908 can correspond to a processing chip (for instance, a microprocessor chip, microcontroller chip, or CPU chip) that provides centralized control of the signal booster system.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A signal booster system comprising:
   an outdoor signal booster comprising:
      a base station antenna configured to receive a radio frequency (RF) downlink signal and to transmit a boosted RF uplink signal, wherein the base station antenna is directional, and
      booster circuitry configured to generate a boosted RF downlink signal based on amplifying one or more downlink channels of the RF downlink signal, and to generate the boosted RF uplink signal based on amplifying one or more uplink channels of an RF uplink signal;
   a shared DC power and RF cable;
   an indoor antenna unit connected to the outdoor signal booster over the shared DC power and RF cable, wherein the indoor antenna unit comprises a mobile station antenna configured to receive the RF uplink signal and to transmit the boosted RF downlink signal, and a booster control interface configured to control the outdoor signal booster; and
   an isolator/combiner circuit configured to provide power to the indoor antenna unit and the outdoor signal booster over the shared DC power and RF cable.

2. The signal booster system of claim 1, wherein the isolator/combiner circuit is separated from the indoor antenna unit and the outdoor signal booster.

3. The signal booster system of claim 2, wherein the isolator/combiner circuit is configured to receive power from an AC outlet over a power cable.

4. The signal booster system of claim 2, wherein the shared DC power and RF cable includes a conductor configured to carry an RF voltage superimposed on a DC supply voltage.

5. The signal booster system of claim 2, wherein the indoor antenna unit further comprises a first DC/RF separator configured to extract a DC supply voltage from the shared DC power and RF cable, and the outdoor signal booster further comprises a second DC/RF separator configured to extract the DC supply voltage from the shared DC power and RF cable.

6. The signal booster system of claim 5, wherein the shared DC power and RF cable includes a first portion coupled between the first DC/RF separator of the indoor antenna unit and the isolator/combiner circuit, and a second portion coupled between the isolator/combiner circuit and the second DC/RF separator of the outdoor signal booster.

7. The signal booster system of claim 1, wherein the base station antenna is a Yagi antenna.

8. The signal booster system of claim 1, wherein the outdoor signal booster comprises at least one of an umbrella, a heat sink, a fan, a shell coating, a sun visor, or a solar reflector for providing protection from overheating.

9. The signal booster system of claim 1, wherein the mobile station antenna is within a housing of the indoor antenna unit.

10. The signal booster system of claim 1, wherein the mobile station antenna extends from a housing of the indoor antenna unit.

11. The signal booster system of claim 1, wherein the indoor antenna unit comprises a WLAN antenna and a router electrically connected to the WLAN antenna to operate the indoor antenna unit as a WLAN access point.

12. The signal booster system of claim 11, wherein the indoor antenna unit is connectable to an external cellular modem.

13. The signal booster system of claim 11, wherein the indoor antenna unit further comprises an integrated cellular modem connected to the router.

14. The signal booster system of claim 1, wherein the indoor antenna unit is configured to charge a mobile device.

15. The signal booster system of claim 1, wherein the indoor antenna unit is configured to display at least one of a status or a temperature of the outdoor signal booster.

16. The signal booster system of claim 15, wherein the indoor antenna unit is configured to display a temperature alarm in response to the outdoor signal booster detecting a high temperature condition.

17. The signal booster system of claim 1, wherein the outdoor signal booster comprises a temperature detector.

18. The signal booster system of claim 17, wherein the outdoor signal booster is configured to operate with a backed-off gain in response to the temperature detector detecting a high temperature condition.

19. The signal booster system of claim 1, wherein the outdoor signal booster is configured to detect and limit an output power of the base station antenna based on at least one emissions specification.

20. The signal booster system of claim 1, installed in a building.

* * * * *